United States Patent [19]

Koteskey

[11] Patent Number: 5,885,452
[45] Date of Patent: Mar. 23, 1999

[54] EFFLUENT FILTERING APPARATUS

[76] Inventor: Gary L. Koteskey, 06598 Horton Bay North Rd., Boyne City, Mich. 49712

[21] Appl. No.: 864,588

[22] Filed: May 28, 1997

[51] Int. Cl.$^6$ .......................... B01D 21/24; B01D 35/00; B01D 35/027

[52] U.S. Cl. ................. 210/309; 210/416.1; 210/497.01; 210/532.2

[58] Field of Search ................................ 210/309, 416.1, 210/416.3, 497.01, 532.1, 532.2

[56] References Cited

U.S. PATENT DOCUMENTS

| | | |
|---|---|---|
| 3,332,552 | 7/1967 | Zabel . |
| 4,439,323 | 3/1984 | Ball . |
| 4,710,295 | 12/1987 | Zabel . |
| 5,207,896 | 5/1993 | Graves . |
| 5,382,357 | 1/1995 | Nurse . |
| 5,427,679 | 6/1995 | Daniels . |
| 5,482,621 | 1/1996 | Nurse . |
| 5,492,635 | 2/1996 | Ball . |
| 5,547,589 | 8/1996 | Carroll, II . |
| 5,580,453 | 12/1996 | Nurse, Jr. . |
| 5,582,716 | 12/1996 | Nurse, Jr. . |
| 5,593,584 | 1/1997 | Nurse, Jr. . |
| 5,618,445 | 4/1997 | Gavin ................................... 210/532.2 |
| 5,645,732 | 7/1997 | Daniels ................................ 210/532.2 |
| 5,683,577 | 11/1997 | Nurse, Jr. ............................... 210/170 |
| 5,690,824 | 11/1997 | Stuth .................................... 210/416.1 |
| 5,720,875 | 2/1998 | Stegall, Sr. et al. ..................... 210/108 |
| 5,762,790 | 6/1998 | Zoeller ................................. 210/532.2 |
| 5,762,793 | 6/1998 | Nurse, Jr. ............................. 210/532.2 |

*Primary Examiner*—David A. Reifsnyder
*Attorney, Agent, or Firm*—Locke Reynolds

[57] ABSTRACT

An effluent filtering apparatus including an effluent filter fluidly connected to the output of an effluent pump disposed in an effluent tank, for providing filtered effluent to a drain field having a plurality of finger pipes defining a plurality of finger apertures. The effluent filter includes a tubular member defining a plurality of filtering orifices through a cylindrical wall. Effluent flows into the tubular member through an open first end and flows out of the tubular member through the filtering orifices, with turbulence within the tubular member preventing at least a portion of solid material present in the effluent from lodging within the filtering orifices. Effluent containing solid material smaller in size than the filtering orifices flows from the effluent tank to the drain field, but larger solid material present in effluent is filtered by the filtering orifices, with the filtering orifices remaining unobstructed for an extended period of time due to turbulent flow within the tubular member. A basket-like filter insert may be disposed within the tubular member proximate to the first end, defining a plurality of openings therethrough permitting flow of effluent but preventing solid material aggregated within the tubular member larger than the dimensions of the openings from flowing backwards from the tubular member and into the pump when the pump is deactivated.

34 Claims, 5 Drawing Sheets

EFFLUENT FILTERING APPARATUS

BACKGROUND OF THE INVENTION

1. Field of the Invention

The present invention generally relates effluent handling and processing apparatus, and more particularly concerns apparatus for filtering of solid material present in effluent before the effluent reaches a drain field, in order to prevent clogging of relatively small drain field finger openings such as are present in low pressure mound sanitary drainage systems.

2. Description of the Prior Art

Low pressure mound sanitary drainage systems are particularly useful in areas where soils are unable to meet percolation rates required for installation of a normal drain field. In low pressure mound sanitary drainage systems, effluent is pumped from an effluent tank downstream of a septic tank into a system of drain field fingers installed in a mound having drainage stone, sand, and other materials deposited inside. Usefulness is limited, however, by clogging of the openings in the drain field fingers by semisolid debris flowing from the septic tank or by solids such as leaves and grass which may enter the effluent tank during servicing or resulting from a loosely fitting effluent tank cover. As drain field finger openings become blocked, flow of effluent is reduced and the low pressure mound sanitary drainage system may be rendered inoperative.

In order to prevent the drain field finger openings from clogging, solid material present in the effluent should be removed prior flow into the drain field fingers. Currently available effluent apparatus include devices having a filter disposed in fluid connection to the input of an effluent pump, for instance those devices and systems described in U.S. Pat. Nos. 5,492,635; 5,427,679; and 4,439,323. In addition, there are presently available a number of filtering apparatus for septic tanks utilizing gravity feed filters, such as those described in U.S. Pat. Nos. 5,593,584; 5,580,453; and 5,382,357, and filters in fluid connection to the input of a septic pump, as described, for instance, in U.S. Pat. No. 5,582,716. Solid material present in effluent may be filtered by such devices, thereby helping to prevent clogging of openings in the drain field fingers, however, the filtering orifices defined by the devices frequently become clogged, requiring cleaning and servicing of the filtering apparatus.

Consequently, despite the availability of such devices, there exists a need in the art for an apparatus that is capable of filtering solid material present in effluent so that openings in drain field fingers remain open, but which includes a filter having filtering orifices which remain open and unclogged for an extended period of time, thereby requiring less frequent servicing and cleaning.

SUMMARY OF THE INVENTION

In order to aid in the understanding of the present invention, it can be stated in essentially summary form that it is directed to an effluent filtering apparatus including an effluent filter fluidly connected to the output of an effluent pump for providing filtered effluent to a drain field, the effluent filter having a tubular member defining a plurality of filtering orifices through a cylindrical wall, whereby turbulent flow of effluent flowing into the tubular member through one end thereof and flowing out of the tubular member through the filtering orifices prevents at least a portion of solid material present in the effluent from lodging within the filtering orifices. Consequently, effluent containing solid material smaller in size than the filtering orifices may flow into the drain field, but larger solid material is filtered, with the filtering orifices remaining unobstructed due to turbulent flow within the tubular member.

More specifically, the effluent filtering apparatus of the present invention includes an effluent tank having a neck defining a service opening, a septic connection orifice, and a main pipe connection orifice. The effluent tank may be disposed below grade, with the top of the neck generally at grade so that access to the interior of the effluent tank is possible through an effluent tank cover removably located covering the service opening. The effluent tank may be disposed in fluid connection with a septic tank by way of a transfer pipe entering the effluent tank through the septic connection orifice. The septic tank in turn may be fluidly connected to a sewage source by a septic pipe. Disposed within the effluent tank is a submersible pump for pumping effluent from the effluent tank into a forced main pipe through the main pipe connection orifice. A plurality of drain field finger pipes are disposed in fluid connection with the main pipe, and each drain field finger pipe defines a plurality of small finger apertures for outflow of filtered effluent into appropriately prepared soil.

A filter is provided for fluid connection between the pump and the main pipe, and may be disposed within the effluent tank. The filter includes a filter housing defining an input orifice, an output orifice, and a generally cylindrical interior chamber. The filter housing may be disposed so that an axis defined by the interior chamber is generally vertical, and input orifice is disposed generally below the interior chamber, proximate to and communicating with a lower end of the interior chamber, with the output orifice disposed proximate to and communicating with a lateral side of the interior chamber. The filter may further define an access opening disposed proximate to and communicating with an upper end of the interior chamber, and may include a removable cover for access to the interior chamber. The input orifice is adapted for sealed fluid connection to the outlet of the effluent pump, and the output orifice is adapted for sealed fluid connection to the forced main pipe.

A filtering member is removably disposed within the interior chamber and includes a generally tubular member having a generally cylindrical wall and defining an open first end and a generally opposing second end. The diameter of the tubular member is less than the diameter defined by the interior chamber, thereby defining a sleeve-like volume within the interior chamber and surrounding the tubular member. A plurality of filtering orifices are defined through the cylindrical wall, and the dimensions of the filtering orifices are selected to be smaller than the dimensions of the finger apertures. The tubular member is disposed generally coaxially within the interior chamber so that the first end is proximate to the input orifice and the second end is proximate to and effectively blocked by the cover, with the first end disposed below the cylindrical wall. A means for producing a signal when pressure within the tubular member exceeds a predetermined level may also be provided by a pressure alarm switch disposed in sealed fluid connection with the filter housing proximate to the input orifice through fluid tubing and a fluid fitting, and electrically connected to an alarm.

In use, effluent enters the filter from the pump and flows generally upward through the input orifice, into the tubular member through the first end, and out of the tubular member through the filtering orifices, and then out of the filter through the output orifice to the forced main pipe. The dimensions of the input orifice, the output orifice and the filtering orifices, and the capacity of the pump are chosen to pump effluent into the filter at a pressure sufficient to cause turbulent flow of effluent within the tubular member. The turbulent flow of effluent prevents at least a portion of solid material present in the effluent from lodging within the filtering orifices. In this way, effluent containing solid material smaller in size than the filtering orifices may flow into the forced main pipe and through the drain field finger pipes, through the finger apertures and into surrounding prepared soil. As a result, solid material present within effluent does not obstruct the finger apertures due to the filtering action of the filtering orifices, and also the filtering orifices remain open and unobstructed for an extended period of time due to the turbulent flow of effluent within the tubular member.

In the event that the filtering orifices become obstructed with solids present in the effluent, the cover may be removed from the filter housing, and the tubular member may be removed, cleaned, and replaced. Further, by adjusting the pressure at which the pressure alarm switch is activated, the alarm may be triggered as desired to indicate need for servicing prior to complete blockage of the filtering orifices.

In a second embodiment of the present invention, a filter insert having a generally circular collar portion and a plurality of arched portions attached thereto form a basket-like structure is disposed within the tubular member proximate to the first end. The filter insert defines a plurality of openings therethrough, and the dimensions of the openings are chosen to permit flow of effluent through the filter insert but prevent movement of solid material greater than a preselected size that may have aggregated within the tubular member. In use, solid material too large to pass through the filtering orifices remains within the tubular member while the pump is operating, and may tend to aggregate together to form a relatively large solid body. When the pump ceases operation, gravity will tend to cause fluid and solids present within the tubular member to flow backwards through the pump. The filter insert prevents aggregated solid material larger than the dimensions of the openings from flowing downward, out of the tubular member, through the input orifice, and into the pump, preventing aggregated solid material from entering, clogging, or damaging the pump.

In a third embodiment, a generally cylindrical screen is disposed within the tubular member, generally conforming to the cylindrical wall, mounted to the tubular member at the first and second ends, and defining a plurality of pores. The screen may formed of a flexible material such as a knitted polymeric material, with the pores having dimensions smaller than the dimensions of the filtering orifices. The cylindrical screen acts as an additional filter, removing solids present in effluent that are smaller in size than solids filtered by the filtering orifices.

In a fourth embodiment, the filter further defines a flushing aperture disposed proximate to the second end of the tubular member. The flushing manifold may be disposed within the effluent tank and in fluid connection with the flushing aperture, and includes a generally U-shaped flushing tube and a flushing filter. A flow restriction orifice is disposed within the flushing tube proximate to the flushing filter. The flushing filter includes a generally tubular flushing member having a generally cylindrical flushing member wall and defining an open flushing member first end and a generally opposing flushing member second end. A plurality of flushing orifices are defined through flushing member wall, and an access plate is removably mounted to the flushing member at the flushing member second end. A sack-like second flushing filter may also be disposed generally surrounding the flushing member by attachment to the flushing member proximate to the flushing member first end. The second flushing filter may be formed of a flexible material defining a plurality of flushing pores having dimensions smaller than flushing orifices. In use, effluent is capable of flowing out of the tubular member through the second end, out of the filter through the flushing aperture, into and through the flushing manifold, the flow restriction orifice, and the flushing filter, and returning into the effluent tank. The size of the flow restriction orifice may be chosen so that a preselected portion of effluent entering the filter is capable of entering the flushing filter and returning to the effluent tank. The flushing manifold facilitates removal of solid material from within the tubular member by flushing such solid material out of the filter with the preselected portion of effluent flowing out of the filter through the flushing aperture. Consequently, the filter requires less frequent servicing to remove solid material that is present within the tubular member or has obstructed the filtering orifices. In addition, presence of the flushing orifices prevents solid material present in the effluent having dimensions larger than the dimensions of the flushing orifices from re-entering effluent tank. Further, presence of the second flushing filter prevents solid material present in the effluent smaller than the dimensions of the flushing orifices but larger than the flushing pores from returning to the effluent tank.

The flushing manifold may be disposed in fluid connection with the flushing aperture of the filter with the flushing tube extending from the effluent tank to the septic tank. With the flushing filter disposed within the septic tank, effluent is capable of flowing out of the filtering member through the second end, out of the filter through the flushing aperture, into and through the flushing manifold, the flow restriction orifice, and the flushing filter, and into the septic tank.

Further features and advantages of the present invention will be apparent from a study of the following portion of the specification, the claims, and the attached drawings.

DETAILED DESCRIPTION OF THE PREFERRED EMBODIMENTS

The following portion of the specification, taken in conjunction with the drawings, sets forth the preferred embodiments of the present invention. The embodiments of the invention disclosed herein are the best modes contemplated for carrying out the invention in a commercial environment, although it should be understood that various modifications can be accomplished within the parameters of the present invention.

Figure 1:
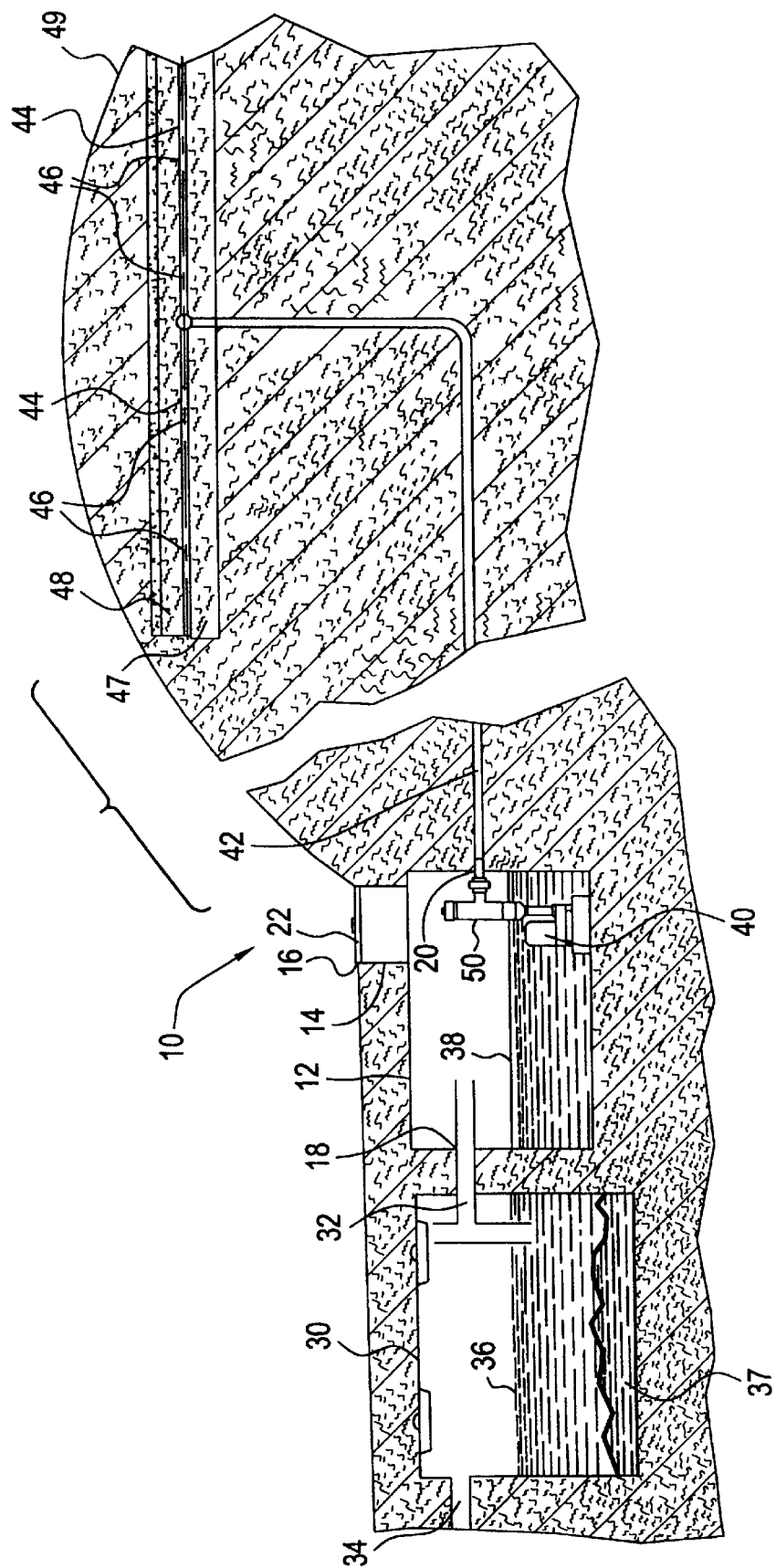
FIG. 1 is a sectional view of an effluent distribution apparatus representing the present invention.
Figure 2:
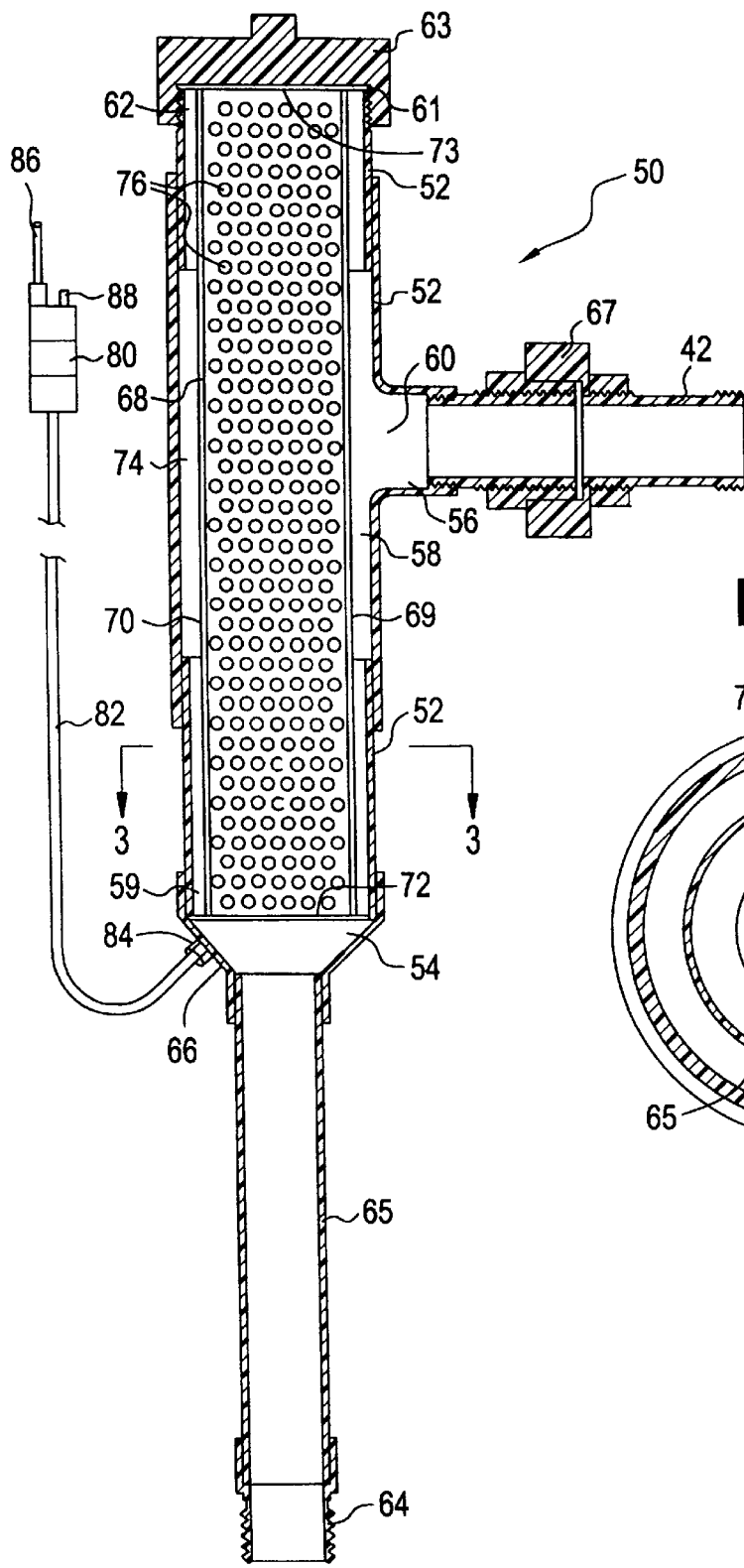
FIG. 2 is an enlarged elevational section view of an effluent filter of an effluent distribution apparatus representing the present invention.
Figure 3:
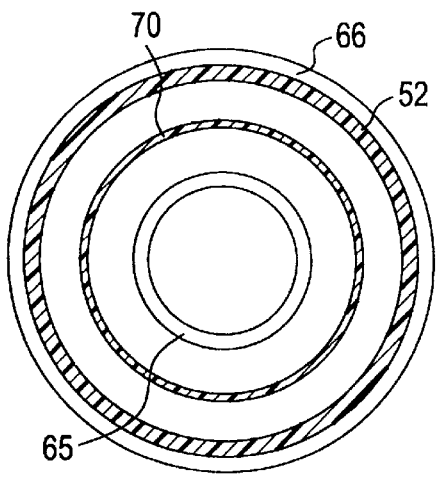
FIG. 3 is an plan section view of an effluent filter of an effluent distribution apparatus taken along line 3—3 of FIG. 2.

Referring now to the drawings for a detailed description of the present invention, reference is first made to FIGS. 1–3 generally depicting an effluent distribution apparatus 10 of the present invention, including effluent tank 12 having neck 14 defining service opening 16, and defining septic connection orifice 18 and main pipe connection orifice 20. Effluent tank 12 may be disposed below grade, with top of neck 14 generally at grade so that access to the interior of effluent tank 12 is possible through effluent tank cover 22 removably located covering service opening 16. Effluent tank 12 is disposed in fluid connection with septic tank 30 by way of transfer pipe 32 entering effluent tank 12 through septic connection orifice 18. Septic tank 30 is in turn fluidly connected to a sewage source, not shown, by septic pipe 34, whereby septic tank liquid 36 and sludge 37 enter septic tank 30. Disposed within effluent tank 12 below level of effluent 38 is submersible pump 40 for pumping effluent 38 from effluent tank 12 into forced main pipe 42 through main pipe connection orifice 20. A plurality of drain field finger pipes 44 are disposed in fluid connection with main pipe 42, with each drain field finger pipe 44 defining a plurality of small finger apertures 46 for outflow of filtered effluent into appropriately prepared soil, such as drainage stone 47 and hay or untreated paper 48 disposed in mound 49. Due to fluid pressure provided by effluent pump 40, drain field finger pipes 44 may be located at an elevation above that of pump 40.

With reference to FIGS. 1–3, filter 50 is provided for fluid connection between pump 40 and main pipe 42, and may be disposed within effluent tank 12. Filter 50 includes filter housing 52 defining input orifice 54, output orifice 56, and generally cylindrical interior chamber 58. Filter housing 52 is disposed so that an axis defined by interior chamber 58 is generally vertical. Input orifice 54 is disposed generally below interior chamber 58, proximate to and communicating with a lower end 59 of interior chamber 58, and output orifice 56 is disposed proximate to and communicating with a side 60 of interior chamber. Filter 50 may further define an access opening 61 disposed proximate to and communicating with an upper end 62 of interior chamber 58, and may include removable cover 63 for access to interior chamber 58. Filter housing 52 and cover 63 may be formed of a sturdy, corrosion resistant material that is easily formed into housings and covers such as PVC. Input orifice 54 is adapted for sealed fluid connection to outlet 64 of effluent pump 40 through extension fitting 65 and reducer 66, and output orifice 56 is adapted for sealed fluid connection to forced main pipe 42 through connective fitting 67. Filtering member 68 is removably disposed within interior chamber 58 and includes generally tubular member 69 having generally cylindrical wall 70 and defining open first end 72 and generally opposing second end 73. The diameter of tubular member 69 is chosen to be less than the diameter of interior chamber 58, in order to define a sleeve-like volume 74 surrounding tubular member 69 and within interior chamber 58. A plurality of filtering orifices 76 are defined through cylindrical wall 70, with the dimensions of filtering orifices 76 selected to be smaller than the dimensions of finger apertures 46. Tubular member 69 may be formed of a sturdy, corrosion resistant material that is easily formed to have a plurality of filtering orifices 76. In a most preferred embodiment, tubular member 69 may be formed of stainless steel, and particularly 22 gauge type 304 stainless steel, and filtering orifices may be approximately 1.6 mm in diameter and collectively defining an open area of approximately 40% of the area of cylindrical wall 70. With tubular member 69 disposed generally coaxially within interior chamber 58 so that first end 72 is proximate to input orifice 54 and second end 73 is proximate to and effectively blocked by cover 63, first end 72 is disposed below cylindrical wall 70.

The present invention may also include means for producing a signal when pressure within tubular member 69 exceeds a predetermined level, for instance, as shown in FIG. 2, pressure alarm switch 80 disposed in sealed fluid connection with filter housing 52 proximate to input orifice 54 through fluid tubing 82 and fluid fitting 84, and electrically connected to an alarm, not shown, by electrical wire 86.

In use, effluent enters filter 50 from pump 40 and flows generally upward through input orifice 54, into tubular member 69 through first end 72, and out of tubular member 69 through filtering orifices 76, and then out of filter 50 through output orifice 56 to forced main pipe 42. The dimensions of input orifice 54, output orifice 56 and filtering orifices 76, and the capacity of pump 40 are selected to pump effluent into filter 50 at a pressure sufficient to cause turbulent flow of effluent within tubular member 69. The turbulent flow of effluent prevents at least a portion of solid material present in the effluent from lodging within filtering orifices 76, whereby effluent containing solid material smaller in size than filtering orifices 76 may flow into forced main pipe 42 and through drain field finger pipes 44, through finger apertures 46 and into the surrounding prepared soil. In this way, solid material present within effluent does not obstruct finger apertures 46 due to the filtering action of filtering orifices 76, and filtering orifices 76 remain open and unobstructed for an extended period of time due to the turbulent flow of effluent within tubular member 69.

In the event that filtering orifices 76 become obstructed with solids present in the effluent, cover 63 may be removed from filter housing 52, and tubular member 69 may be removed, cleaned, and replaced. Moreover, as filtering orifices 76 become clogged, pressure within tubular member 69 increases during effluent flow. By adjusting the pressure at which pressure alarm switch 80 is activated, using adjustment knob 88, the alarm may be triggered as desired to indicate need for servicing.

It will be recognized of course that effluent distribution system 10 and filter 50 may each be utilized with a wide variety of effluent and septic systems, in addition to low pressure mound sanitary drainage systems.

Figure 4:
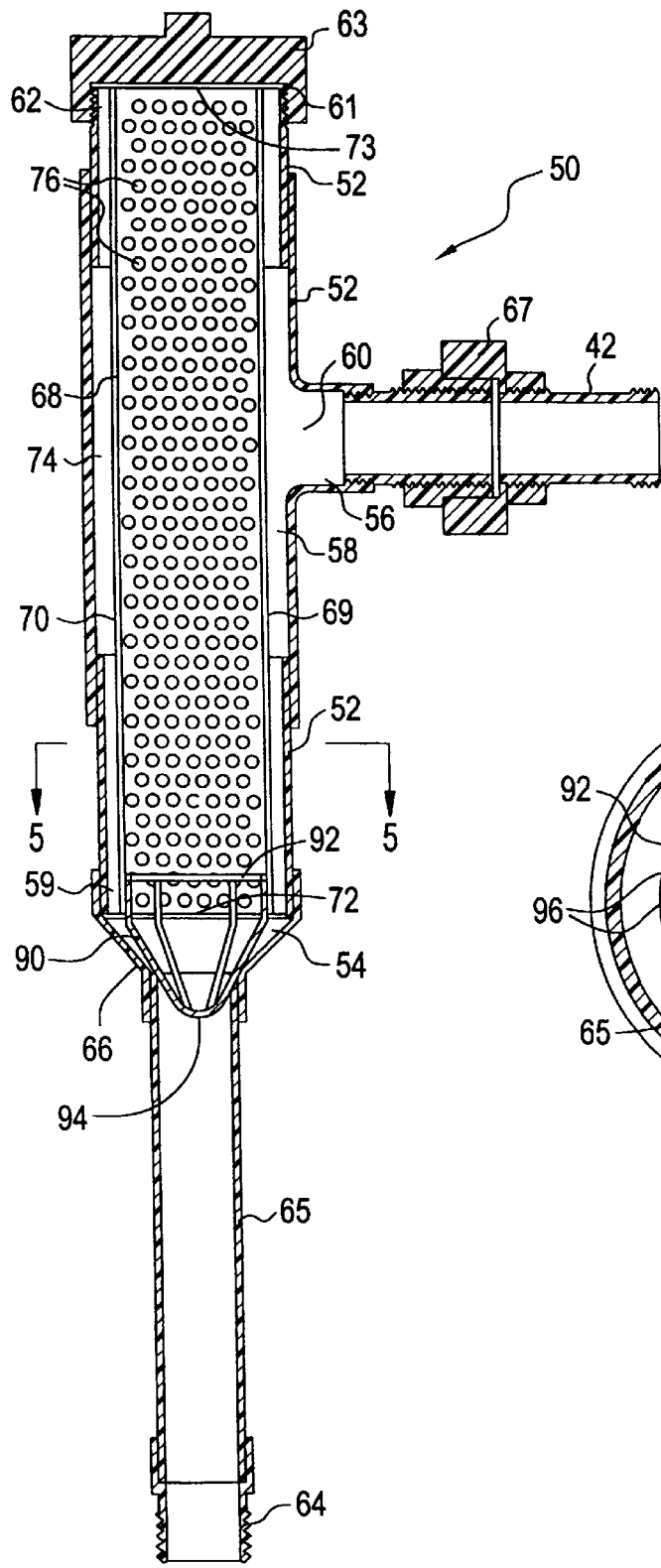
FIG. 4 is an enlarged elevational section view of an effluent filter of an effluent distribution apparatus representing a second embodiment of the present invention.
Figure 5:
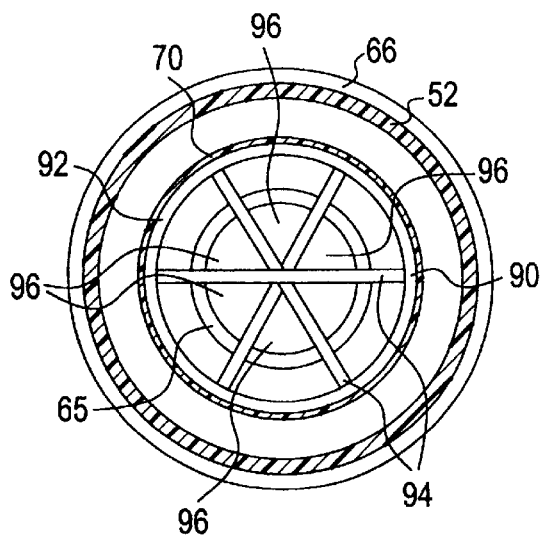
FIG. 5 is an plan section view of an effluent filter of an effluent distribution apparatus taken along line 5—5 of FIG. 4.

In a second embodiment of the present invention, as depicted in FIGS. 4–5, filter insert 90, having generally circular collar portion 92 and plurality of arched portions 94 attached to collar portion 92 to form a basket-like structure, is disposed within tubular member 69 proximate to first end 72. Filter insert 90 defines a plurality of openings 96 therethrough, and the dimensions of openings 96 may be chosen to permit flow of effluent through filter insert 90, but prevent movement of solid material greater than a preselected size that has aggregated within tubular member 69. In use, solid material too large to pass through filtering orifices 76 remains within tubular member 69 while pump 40 is operating and providing sufficient fluid pressure, and the solid material may tend to aggregate together to form a relatively large solid body. When pump 40 ceases operation, gravity may tend to cause fluid and solids present within tubular member 69 to flow backwards through pump 40. Filter insert 90 acts to prevent aggregated solid material larger than the dimensions of openings 96 from flowing downward, out of tubular member 69, through input orifice 54, and into pump 40 when pump 40 is deactivated. In this way, filter insert 90 aids in preventing aggregated solid material from entering, clogging, and damaging pump 40.

Figure 6:
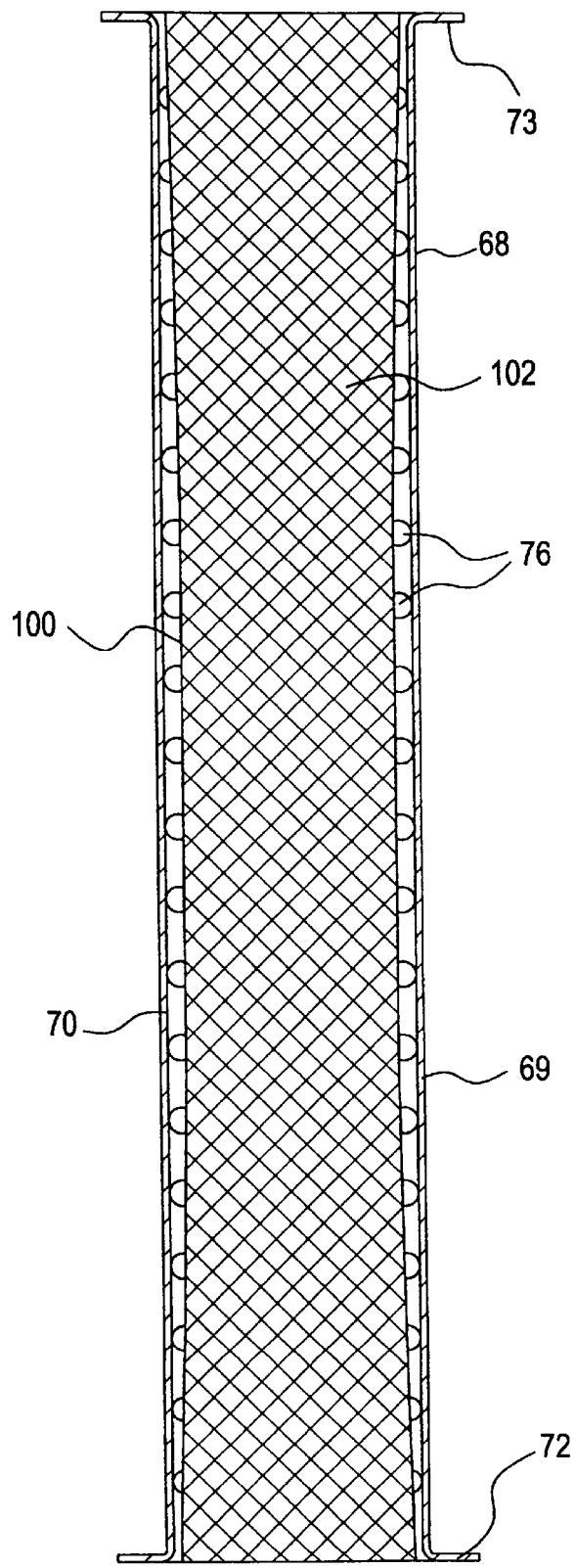
FIG. 6 is an enlarged elevational section view of the filtering member of an effluent filter of an effluent distribution apparatus representing a third embodiment of the present invention.

Referring now to FIG. 6, in a third embodiment of the present invention, generally cylindrical screen 100 is disposed within tubular member 69, generally conforming to cylindrical wall 70 and mounted to tubular member 69 at first end 72 and at second end 73. Cylindrical screen 100 defines a plurality of pores 102 having dimensions smaller than the dimensions of filtering orifices 76, and may be formed of a flexible material such as a knitted polymeric material. One particular preferred material is knitted polyester material having 100 p.s.i. burst strength and an apparent opening size of 30 sieve. In use, cylindrical screen 100 acts as an additional filter, removing solids present in effluent that are smaller in size than solids that are filtered by filtering orifices 76.

Figure 7:
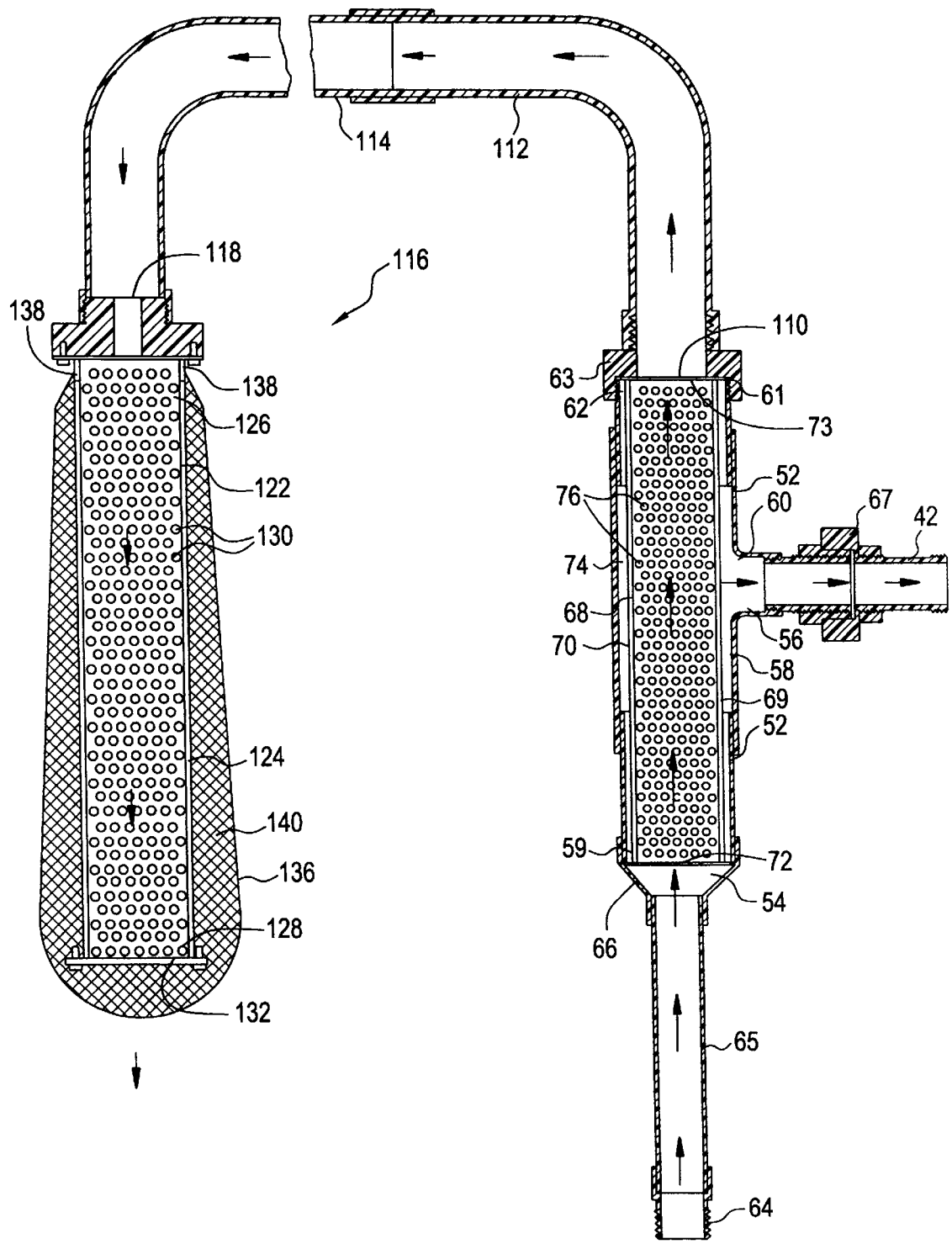
FIG. 7 is an elevational section view of an effluent distribution apparatus representing a fourth embodiment of the present invention.

In a fourth embodiment of the present invention, illustrated in FIG. 7, filter 50 further defines flushing aperture 110 disposed through cover 63 and proximate to second end 73 of tubular member 69. Flushing manifold 112 is disposed within effluent tank 12 and in fluid connection with flushing aperture 110, and includes generally U-shaped flushing tube 114 and flushing filter 11 6. Flow restriction orifice 118 is disposed within flushing tube 114 proximate to flushing filter 116. Flushing filter 116 includes generally tubular flushing member 122 having generally cylindrical flushing member wall 124 and defining open flushing member first end 126 and generally opposing open flushing member second end 128. A plurality of flushing orifices 130 are defined through flushing member wall 124, and access plate 132 is removably mounted to flushing member 122, covering flushing member second end 128. Flushing tube 114 may be formed of a sturdy, corrosion resistant material that is easily formed into tubes such as PVC. Flushing member 122 may be formed of a sturdy, corrosion resistant material that is easily formed to have a plurality of flushing orifices 130, such as stainless steel, and particularly type 304 stainless steel. Sack-like second flushing filter 136 may also be provided and disposed generally surrounding flushing member 122 by attachment to flushing member 122 proximate to flushing member first end 126 using clamp 138. Second flushing filter 136 may be formed of a flexible material defining a plurality of flushing pores 140 having dimensions smaller than flushing orifices 130, and may be formed of a flexible material such as a knitted polymeric material. One particular preferred material is knitted polyester material having 100 p.s.i. burst strength and an apparent opening size of 30 sieve.

In use, effluent is capable of flowing out of tubular member 69 through second end 73, out of filter 50 through flushing aperture 110, into and through flushing manifold 112, flow restriction orifice 118, and flushing filter 116, and returning into effluent tank 12. The size of flow restriction orifice 118 is chosen so that a preselected portion of effluent entering filter 50, preferably approximately 10%, is capable of entering flushing filter 116 and returning to effluent tank 12. Flushing manifold 112 helps facilitate removal of solid material from within tubular member 69, by flushing such solid material out of filter 50 with the preselected portion of effluent which flows out of filter 50 through flushing aperture 110, so that filter 50 less frequently requires servicing to remove solid material that is present within tubular member 69 or has obstructed filtering orifices 76. Presence of flushing orifices 130 prevents solid material present in the effluent that has dimensions larger than the dimensions of flushing orifices 130 from returning to effluent tank 12. In addition, presence of second flushing filter 136 prevents solid material present in the effluent having dimensions smaller than the dimensions of flushing orifices 130 but larger than flushing pores 140 from re-entering effluent tank 12.

It will be recognized that flushing manifold 112 may alternatively be disposed in fluid connection with flushing aperture 110 of filter 50 with flushing tube 114 extending from effluent tank 12 to septic tank 30, so that flushing filter 116 is disposed within septic tank 30. In this way, the effluent distribution apparatus of the present invention provides fluid connection to septic tank 30, whereby effluent is capable of flowing out of filtering member 68 through second end 73, out of filter 50 through flushing aperture 110, into and through flushing manifold 112, flow restriction orifice 118, and flushing filter 116, and into septic tank 30.

The present invention having been described in its preferred embodiments, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. An effluent filter comprising:
   a filter housing defining an input orifice, an output orifice, and an interior chamber, the input orifice adapted for fluid connection to an outlet of an effluent pump, and the output orifice adapted for fluid connection to a forced main pipe; and
   a filtering member disposed within the interior chamber and defining a plurality of filtering orifices, each filtering orifice having dimensions smaller than a preselected size wherein dimensions of the input orifice, the output orifice and the filtering orifices are selected so that effluent is capable of flowing into the filter housing from the effluent pump at a pressure producing turbulent fluid flow of effluent proximate to the filtering member preventing at least a portion of solid material present in the effluent from lodging within the filtering orifices.

2. An effluent filter as recited in claim 1, wherein the filtering member includes a generally tubular member having a generally cylindrical wall defining the filtering orifices.

3. An effluent filter as recited in claim 2, wherein the tubular member has an open first end and is disposed within filter housing so that effluent is capable of flowing from the effluent pump into the filter housing through the input orifice, into the tubular member through the first end, out of the tubular member through the filtering orifices, and out of the filter housing through the output orifice, whereby turbulent fluid flow of effluent within the tubular member prevents at least a portion of solid material present in the effluent from lodging within the filtering orifices.

4. An effluent filter as recited in claim 3, wherein an axis defined by the tubular member is disposed generally vertically and the first end is disposed below the cylindrical wall, whereby effluent is capable of flowing generally upward through the first end and into the tubular member.

5. An effluent filter as recited in claim 4, further comprising a filter insert adapted to be inserted within the tubular member proximate to the first end and defining a plurality of openings therethrough having dimensions permitting flow of effluent but preventing movement of aggregated solid material greater than a preselected size from the tubular member through the input orifice when the pump is deactivated.

6. An effluent filter as recited in claim 3, further comprising a generally cylindrical screen disposed within the tubular member, generally conforming to the cylindrical wall, and defining a plurality of pores having dimensions smaller than the filtering orifices.

7. An effluent filter as recited in claim 6, wherein the cylindrical screen is formed of a flexible material.

8. An effluent filter as recited in claim 6, wherein the flexible material is knitted polymeric material.

9. An effluent filter as recited in claim 1, wherein the filtering member is removably mounted within the filter housing, and the filter housing includes a removable cover adapted to provide access to the filtering member.

10. An effluent distribution apparatus comprising:
   an effluent tank;
   a pump for pumping effluent from the tank;
   a forced main pipe;
   a filter disposed in fluid connection between the pump and the pipe; and
   at least one drain field finger pipe disposed in fluid connection with the pipe and defining at least one aperture.

11. An effluent distribution apparatus as recited in claim 10, wherein the filter includes a filtering member defining a plurality of filtering orifices, each filtering orifice smaller than the at least one aperture.

12. An effluent distribution apparatus as recited in claim 11, wherein the pump is adapted to pump effluent into the filter at a pressure causing turbulence proximate to the filtering member preventing at least a portion of solid material present in the effluent from lodging within the filtering orifices.

13. An effluent distribution apparatus as recited in claim 11, wherein the filtering member is removably mounted within the filter, and the filter includes a removable cover adapted to provide access to the filtering member.

14. An effluent distribution apparatus as recited in claim 11, wherein the filtering member includes a generally tubular member having a generally cylindrical wall defining the filtering orifices.

15. An effluent distribution apparatus as recited in claim 14, wherein the tubular member has an open first end and is disposed within filter so that effluent is capable of flowing into the tubular member through the first end, out of the tubular member through the filtering orifices, and out of the filter into the pipe, whereby turbulent fluid flow of effluent within the tubular member prevents at least a portion of solid material present in the effluent from lodging within the filtering orifices.

16. An effluent distribution apparatus as recited in claim 15, wherein an axis defined by the tubular member is disposed generally vertically and the first end is disposed below the cylindrical wall, whereby effluent is capable of flowing generally upward through the first end and into the tubular member.

17. An effluent distribution apparatus as recited in claim 15, further comprising a filter insert adapted to be inserted within the tubular member proximate to the first end and defining a plurality of openings therethrough having dimensions permitting flow of effluent but preventing movement of aggregated solid material greater than a preselected size from the filter to the pump when the pump is deactivated.

18. An effluent distribution apparatus as recited in claim 15, further comprising means for producing a signal indicating fluid pressure proximate to the first end exceeds a predetermined level.

19. An effluent distribution apparatus as recited in claim 18, wherein the means for producing a signal includes a pressure alarm switch disposed in sealed fluid connection with the filter proximate to the first end, adapted to produce an electrical signal when fluid pressure proximate to the first end exceeds the predetermined level.

20. An effluent distribution apparatus as recited in claim 15, further comprising a generally cylindrical screen disposed within the tubular member, generally conforming to the cylindrical wall, and defining a plurality of pores having dimensions smaller than the filtering orifices.

21. An effluent distribution apparatus as recited in claim 20, wherein the cylindrical screen is formed of a flexible material.

22. An effluent distribution apparatus as recited in claim 21, wherein the flexible material is knitted polymeric material.

23. An effluent distribution apparatus as recited in claim 15, wherein the tubular member has an open second end disposed generally opposing the first end and the filter defines a flushing aperture disposed proximate to the second end, and further comprising a flushing manifold disposed in fluid connection with the flushing aperture and including a flushing filter disposed in the tank and a flow restriction orifice, whereby effluent is capable of flowing out of the tubular member through the second end, out of the filter through the flushing aperture, into and through the flushing manifold, the flow restriction orifice, and the flushing filter, and into the tank, with the flow restriction orifice chosen so that a preselected portion of effluent entering the filter is capable of flowing into the flushing filter.

24. An effluent distribution apparatus as recited in claim 23, wherein the flushing filter includes a flushing member having a plurality of flushing orifices and a removable access portion.

25. An effluent distribution apparatus as recited in claim 24, further comprising a second flushing filter disposed generally surrounding the flushing member and defining a plurality of pores having dimensions smaller than the flushing orifices.

26. An effluent distribution apparatus as recited in claim 25, wherein the second flushing filter is formed of a flexible material.

27. An effluent distribution apparatus as recited in claim 26, wherein the flexible material is knitted polymeric material.

28. An effluent distribution apparatus as recited in claim 10, wherein the filter is disposed within the tank.

29. An effluent distribution apparatus as recited in claim 10, wherein the pump disposed within the tank.

30. An effluent distribution apparatus for fluid connection to a septic tank, comprising:
   an effluent tank;
   a pump for pumping effluent from the effluent tank;
   a forced main pipe;
   at least one drain field finger pipe disposed in fluid connection with the pipe and defining at least one aperture;
   a filter disposed in fluid connection between the pump and the pipe and including a generally tubular filtering member having an open first end, an opposing open second end, and a generally cylindrical wall defining a plurality of filtering orifices, each filtering orifice smaller than the at least one aperture, the filter defining a flushing aperture disposed proximate to the second end, and the filtering member disposed within filter so that effluent is capable of flowing into the filtering member through the first end, out of the filtering member through the filtering orifices, and out of the filter into the pipe, whereby turbulent fluid flow of effluent within the filtering member prevents at least a portion of solid material present in the effluent from lodging within the filtering orifices; and a flushing manifold disposed in fluid connection with the flushing aperture and including a flow restriction orifice and a flushing filter adapted for placement in the septic tank, whereby effluent is capable of flowing out of the filtering member through the second end, out of the filter through the flushing aperture, into and through the flushing manifold, the flow restriction orifice, and the flushing filter, and into the septic tank.

31. An effluent distribution apparatus as recited in claim 30, wherein the flushing filter includes a flushing member having a plurality of flushing orifices and a removable access portion.

32. An effluent distribution apparatus as recited in claim 31, further comprising a second flushing filter disposed generally surrounding the flushing member and defining a plurality of pores having dimensions smaller than the flushing orifices.

33. An effluent distribution apparatus as recited in claim 32, wherein the second flushing filter is formed of a flexible material.

34. An effluent distribution apparatus as recited in claim 33, wherein the flexible material is knitted polymeric material.

* * * * *